(12) United States Patent
Noda et al.

(10) Patent No.: US 10,828,782 B2
(45) Date of Patent: Nov. 10, 2020

(54) ROBOT SYSTEM, ROBOT, AND ROBOT CONTROL APPARATUS

(71) Applicant: Seiko Epson Corporation, Tokyo (JP)

(72) Inventors: Takahiko Noda, Azumino (JP); Takashi Nammoto, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/525,823

(22) Filed: Jul. 30, 2019

(65) Prior Publication Data

US 2019/0351556 A1 Nov. 21, 2019

Related U.S. Application Data

(62) Division of application No. 15/284,820, filed on Oct. 4, 2016, now Pat. No. 10,406,692.

(30) Foreign Application Priority Data

Oct. 7, 2015 (JP) ................... 2015-199154

(51) Int. Cl.
*B25J 9/16* (2006.01)
*B25J 9/00* (2006.01)
(Continued)

(52) U.S. Cl.
CPC ........... *B25J 9/1694* (2013.01); *B25J 9/0084* (2013.01); *B25J 9/06* (2013.01); *B25J 9/163* (2013.01);
(Continued)

(58) Field of Classification Search
CPC . B25J 9/1694; B25J 13/085; B25J 9/06; B25J 9/163; B25J 9/0084; G05B 19/423;
(Continued)

(56) References Cited

U.S. PATENT DOCUMENTS 5,596,683 A * 1/1997 Kasagami .............. B25J 9/1682
700/248
6,360,144 B1 * 3/2002 Bacchi ..................... B25J 9/042
414/744.3
(Continued)

FOREIGN PATENT DOCUMENTS

JP 60-108286 A 6/1985
JP 06-155346 A 6/1994
(Continued)

*Primary Examiner* — Jason Holloway
(74) *Attorney, Agent, or Firm* — Harness, Dickey & Pierce, P.L.C.

(57) ABSTRACT

A robot system includes an arm with a plurality of joints, the arm being configured to assume a first position and a second position, an end effector attached to the arm, the end effector having a specific position, and a force detector configured to detect a force or a torque applied to or generated by the arm or the end effector, and a robot control apparatus configured to receive an output value from the force detector to change the arm from the first position to the second position while the end effector remains in the specific position, and store the second position of the arm in a memory so as to relate the second position of the arm with the specific position of the end effector.

1 Claim, 11 Drawing Sheets

(51) Int. Cl.
  *B25J 9/06* (2006.01)
  *G05B 19/423* (2006.01)
  *B25J 13/08* (2006.01)

(52) U.S. Cl.
  CPC .......... *B25J 13/085* (2013.01); *G05B 19/423* (2013.01); *G05B 2219/39109* (2013.01); *G05B 2219/39414* (2013.01)

(58) Field of Classification Search
  CPC ........... G05B 2219/39109; G05B 2219/39414; G05B 2219/39322; G05B 19/425; G06F 3/016
  See application file for complete search history.

(56) References Cited

U.S. PATENT DOCUMENTS

| | | | | |
|---|---|---|---|---|
| 6,459,926 | B1* | 10/2002 | Nowlin | A61B 34/70 600/102 |
| 6,477,448 | B1* | 11/2002 | Maruyama | B25J 13/02 700/302 |
| 10,144,132 | B2* | 12/2018 | Yokoi | B25J 9/1633 |
| 2011/0067521 | A1* | 3/2011 | Linn | B25J 15/0009 74/490.06 |
| 2011/0264111 | A1* | 10/2011 | Nowlin | B25J 9/1682 606/130 |
| 2011/0270271 | A1* | 11/2011 | Nowlin | B25J 9/1682 606/130 |
| 2012/0185089 | A1* | 7/2012 | Schreiber | B25J 9/1656 700/250 |
| 2012/0239192 | A1* | 9/2012 | Yamato | B25J 9/1682 700/250 |
| 2013/0030569 | A1* | 1/2013 | Fudaba | G05B 19/423 700/245 |
| 2016/0184996 | A1* | 6/2016 | Ishige | B25J 9/1692 700/254 |
| 2016/0263747 | A1* | 9/2016 | Yokoi | B25J 9/1633 |
| 2016/0354925 | A1* | 12/2016 | Shimodaira | B25J 9/1633 |

FOREIGN PATENT DOCUMENTS

| | | |
|---|---|---|
| JP | 2008-110406 A | 5/2008 |
| JP | 2010-120124 A | 6/2010 |
| JP | 2014-128843 A | 7/2014 |
| JP | 2014-184541 A | 10/2014 |

* cited by examiner

ROBOT SYSTEM, ROBOT, AND ROBOT CONTROL APPARATUS

CROSS-REFERENCE TO RELATED APPLICATIONS

This application is a divisional of U.S. patent application Ser. No. 15/284,820, filed Oct. 4, 2016, which claims priority to Japanese Patent Application No. 2015-199154, filed Oct. 7, 2015, the disclosures of which are hereby expressly incorporated by reference herein in their entireties.

BACKGROUND

1. Technical Field

The present invention relates to a robot system, a robot, and a robot control apparatus.

2. Related Art

Research and development of methods of teaching actions to robots are carried out.

In this regard, a method of grasping an operating device attached to an arm and teaching an action to a robot by direct teaching is known (see Patent Document 1 (JP-A-2014-184541)).

However, according to the method, indirect teaching it is impossible to move the joint of the arm with the position and the attitude of the hand tip of the robot fixed, and it may be difficult to teach a desired action to the robot.

SUMMARY

An aspect of the invention is directed to a robot system including an arm with a plurality of joints, the arm being configured to assume a first position and a second position, an end effector attached to the arm, the end effector having a specific position, and a force detector configured to detect a force or a torque applied to or generated by the arm or the end effector, and a robot control apparatus configured to: receive an output value from the force detector to change the arm from the first position to the second position while the end effector remains in the specific position, and store the second position of the arm in a memory so as to relate the second position of the arm with the specific position of the end effector.

According to the configuration, in the robot system, the arm is changed its position from the first position to the second position based on the output value from the force detector while the end effector remains in the specific position, and the second position of the arm is stored in a memory so as to relate the second position of the arm with the specific position of the end effector. Thereby, the robot system can memorize a desired action by direct teaching.

As another aspect of the invention, the robot system is configured such that the robot control apparatus changes the position of the arm by moving an elbow of the arm based on the output value from the force detector.

According to the configuration, the robot system changes the position of the arm by moving the elbow of the arm based on the output value from the force detector. Thereby, the robot system can memorize a desired action with movement of the elbow of the arm by direct teaching.

As another aspect of the invention, the robot system is configured such that the robot control apparatus changes the position of the arm based on torque generated by a twist on the end effector.

According to the configuration, the robot system changes the position of the arm based on the torque generated by a twist on the end effector. Thereby, the robot system can memorize a desired action based on the torque generated by a twist on the end effector by direct teaching.

As another aspect of the invention, the robot system is configured such that the robot control apparatus detects the torque based on the output value from the force detector.

According to the configuration, the robot system detects the torque based on the output value from the force detector. Thereby, the robot system can memorize a desired action based on the torque detected based on the output value from the force detector by direct teaching.

As another aspect of the invention, the robot system is configured such that the robot control apparatus can switch between a first mode and a second mode. The end effector is set in the specific position in the first mode while the first position of the arm is changed to the second position of the arm based on the output value from the force detector. In the second mode, the specific position of the end effector is changed to another position based on the output value from the force detector.

According to the configuration, the robot system can switch between the first mode of changing the position of the arm based on the output value from the force detector and the second mode of changing the position of the end effector based on the output value from the force detector with the end effector set in the specific position. Thereby, the robot system can memorize a desired action by switching between the first mode and the second mode by direct teaching.

As another aspect of the invention, the robot system includes a switch for switching between the first mode and the second mode.

According to the configuration, in the robot system, the switch is configured to switch between the first mode and the second mode. Thereby, the robot system can memorize a desired action by switching between the first mode and the second mode using the switch for switching between the first mode and the second mode by direct teaching.

As another aspect of the invention, the robot system is configured such that the switch is provided on the end effector.

As another aspect of the invention, the robot system is configured such that the switch is provided on the arm.

As another aspect of the invention, the robot system is configured such that the robot control apparatus includes a switch for switching between the first mode and the second mode.

As another aspect of the invention, the robot system is configured such that the robot operates with a degree of freedom of seven axes.

According to the configuration, the robot system can memorize positions of the arm by changing the position of the arm based on the output value from the force detector with the end effector of the robot that operates with a degree of freedom of seven axes set in desired position and attitude. Thereby, the robot system can memorize a desired action to the arm that operates with the degree of freedom of seven axes by direct teaching.

Still another aspect of the invention is directed to a robot including an arm with a plurality of joints, the arm being configured to assume a first position and a second position, to which an end effector can be attached, the end effector having a specific position. The robot is configured to receive an output value from a force detector to change the arm from the first position to the second position while the end effector is set in the specific position, and store the second position of the arm in a memory so as to relate the second position of the arm with the specific position of the end effector.

According to the configuration, the robot can memorize positions of the arm by changing the position of the arm based on the output value from the force detector with the end effector set in the desired position. Thereby, the robot can memorize a desired action by direct teaching.

Yet another aspect of the invention is directed to a robot control apparatus configured to control a robot, the robot including an arm with a plurality of joints and an end effector attached to the arm, the arm being configured to assume a first position and a second position, the end effector having a specific position. The robot control apparatus comprises a memory and a controller. The controller is configured to receive an output value from a force detector to change the arm from the first position to the second position while the end effector is set in the specific position, and store the second position of the arm in the memory so as to relate the second position of the arm with the specific position of the end effector.

According to the configuration, the robot control apparatus may perform teaching by changing the attitude of the arm based on the output value from the force detector with the end effector set in desired position and attitude. Thereby, the robot control apparatus can memorize a desired action by direct teaching.

As described above, the robot system, the robot, and the robot control apparatus can memorize positions of the arm by changing the position of the arm based on the output value from the force detector with the end effector set in desired position. Thereby, the robot system, the robot, and the robot control apparatus can memorize a desired action by direct teaching.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
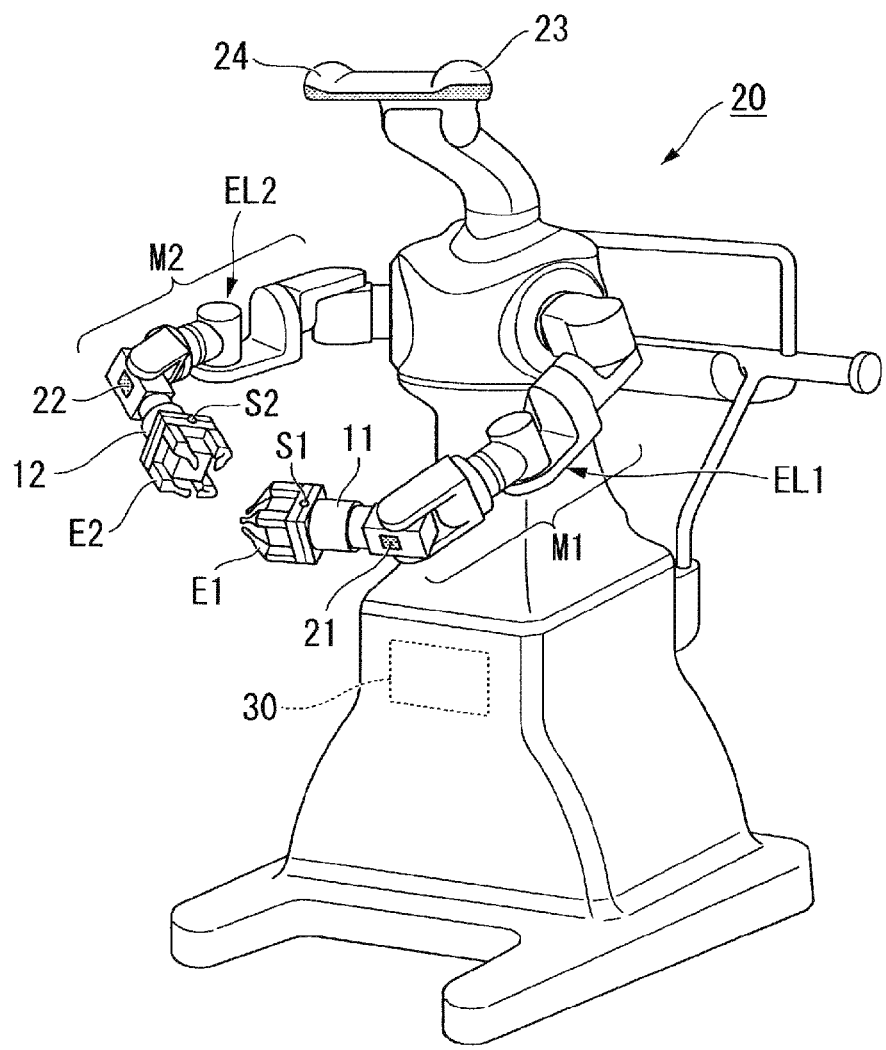
FIG. 1 is a configuration diagram showing an example of a robot 20 according to an embodiment.

As below, an embodiment of the invention will be explained with reference to the drawings. FIG. 1 is a configuration diagram showing an example of a robot 20 according to the embodiment.

First, a configuration of the robot 20 is explained.

The robot 20 is a dual-arm robot including a first arm, a second arm, a support that supports the first arm and the second arm, and a robot control apparatus 30. The dual-arm robot is a robot having two arms like the first arm and the second arm in the example. Note that the robot 20 may be a single-arm robot in place of the dual-arm robot. The single-arm robot is a robot having a single arm. For example, the single-arm robot has one of the first arm and the second arm. Further, the robot 20 may be a multi-arm robot having three or more arms in place of the dual-arm robot. The first arm and the second arm are respective examples of the arms.

The first arm includes a first end effector E1, a first switch S1, a first manipulator M1, and a first force detector 11. Note that, in the embodiment, the case where the first arm includes the first end effector E1 is explained, however, the first arm and the first end effector E1 may be separately formed. In this case, the first arm includes the first manipulator M1 and the first force detector 11.

The first end effector E1 is an end effector having hook portions that can grasp an object in the example. Note that the first end effector E1 may be another end effector such as an end effector having an electrical screwdriver in place of the end effector having the hook portions. The first end effector E1 is a part corresponding to the hand tip of the first arm. The first end effector E1 is an example of the end effector.

The first end effector E1 is communicably connected to the robot control apparatus 30 by a cable. Thereby, the first end effector E1 performs actions according to control signals acquired from the robot control apparatus 30. Wired communications via the cable are performed according to standards of e.g. Ethernet (registered trademark), USB (Universal Serial Bus), or the like. Or, the first end effector E1 may be adapted to be connected to the robot control apparatus via wireless communications performed according to communication standards of Wi-Fi (registered trademark) or the like.

The first switch S1 is a switch for switching a control mode when the robot control apparatus 30 controls the robot 20. The first switch S1 is provided in the first end effector E1 in the example. Note that the first switch S1 may be provided in another part of the first arm such as the first manipulator M1 or the robot control apparatus 30 instead. In this case, the robot 20 may have a configuration without the first end effector E1.

Figure 2:
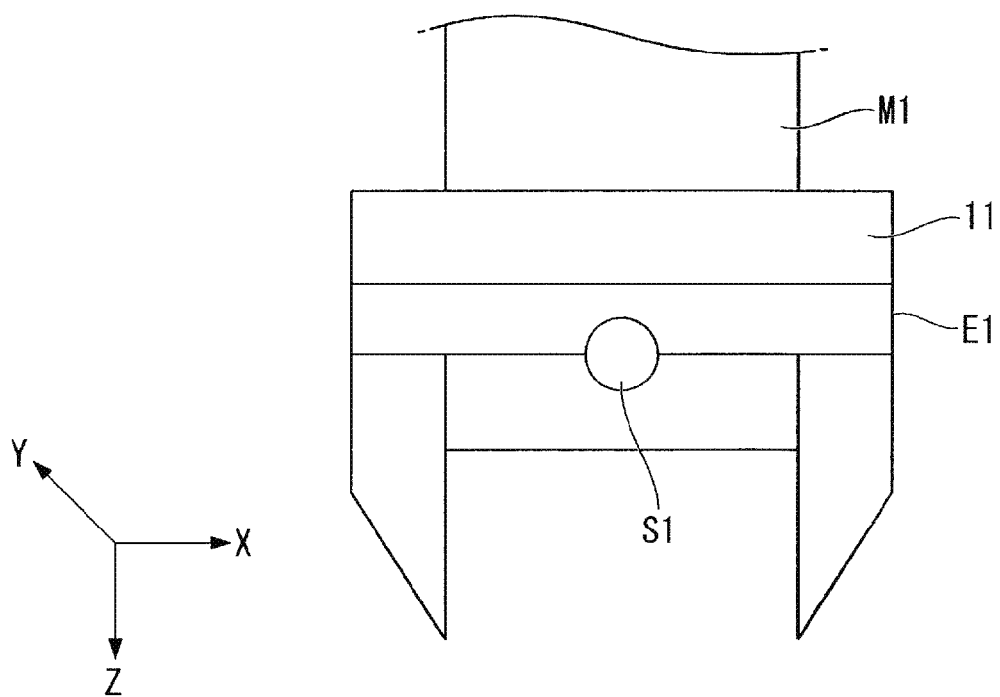
FIG. 2 shows an example of a first end effector E1 provided with a first switch S1.

Here, referring to FIG. 2, the first end effector E1 provided with the first switch S1 is explained. FIG. 2 shows an example of the first end effector E1 provided with the first switch S1. A three-dimensional coordinate system shown in FIG. 2 is a local coordinate system indicating the position and the attitude of the first end effector E1. In the example, TCP (Tool Center Point) of the first arm is set to coincide with the origin of the local coordinate system indicating the position and the attitude of the first end effector E1. In other words, the position of the origin of the local coordinate system indicates the position of the TCP of the first arm, and the directions of the three coordinate axes of the local coordinate system indicate the attitude of the TCP of the first arm. Further, as shown in FIG. 2, the first switch S1 is provided on a side surface of the first end effector E1 in the example. The side surface of the first end effector E1 refers to a side surface assuming that the side of the first end effector E1 placed on the first manipulator M1 is the rear surface and the hook portion side of the first end effector E1 is the front surface.

The first manipulator M1 has joint J1 to joint J7 as seven joints and a first imaging unit 21. Further, each of the joint J1 to joint J7 has an actuator (not shown). In other words, the first arm having the first manipulator M1 is a seven-axis vertical articulated arm. The first arm performs actions with the degree of freedom of seven axes by cooperative motion of the support, the first end effector E1, the first manipulator M1, and the respective actuators of the joint J1 to joint J7 as the seven joints of the first manipulator M1. Note that the first arm may be adapted to operate with the degree of freedom of eight or more axes.

When the first arm operates with the degree of freedom of seven axes, the number of attitudes that can be taken is larger than that in the case where the first arm operates with the degree of freedom of six or less axes. Thereby, the first arm may smoothly move and easily avoid interferences with objects existing around the first arm, for example. Further, when the first arm operates with the degree of freedom of seven axes, control of the first arm is easier than that in the case where the first arm operates with the degree of freedom of eight or more axes because the calculation amount is less.

As shown in FIG. 1, the joint J4 as the fourth joint from the support side of the seven joints of the first manipulator M1 is a joint corresponding to an elbow EL1 of the first arm. Further, the joint J7 as the seventh joint from the support side of the seven joints of the first manipulator M1 is an example of the most distal end joint of the joints of the arm. On the opposite end to the support of the ends of the joint J7, a flange for placement of the first end effector E1 is provided.

The seven actuators (of the joints) of the first manipulator M1 are respectively communicably connected to the robot control apparatus 30 by cables. Thereby, the actuators operate the first manipulator M1 based on the control signals acquired from the robot control apparatus 30. Wired communications via the cables are performed according to standards of e.g. Ethernet (registered trademark), USB, or the like. Or, part or all of the seven actuators of the first manipulator M1 may be adapted to be connected to the robot control apparatus 30 via wireless communications performed according to communication standards of Wi-Fi (registered trademark) or the like.

The first imaging unit 21 is a camera including e.g. a CCD (Charge Coupled Device), a CMOS (Complementary Metal Oxide Semiconductor), or the like as an imaging device that converts collected lights into electrical signals. In the example, the first imaging unit 21 is provided in a part of the first manipulator M1. Accordingly, the first imaging unit 21 moves according to the movement of the first arm. Further, the range in which the first imaging unit 21 can capture images changes according to the movement of the first arm. The first imaging unit 21 may capture a still image of the range or a moving image of the range.

Further, the first imaging unit 21 is communicably connected to the robot control apparatus 30 by a cable. Wired communications via the cable are performed according to standards of e.g. Ethernet (registered trademark), USB, or the like. Or, the first imaging unit 21 may be adapted to be connected to the robot control apparatus 30 via wireless communications performed according to communication standards of Wi-Fi (registered trademark) or the like.

The first force detector 11 is provided between the first end effector E1 and the first manipulator M1. The first force detector 11 is e.g. a force sensor. The first force detector 11 detects a force and moment (torque) acting on the first end effector E1 (or the flange for providing the first end effector E1 in the first manipulator M1). The first force detector 11 outputs first force detection information containing a value indicating the magnitude of the detected force or moment as an output value to the robot control apparatus 30 via communications.

The first force detection information is used for control based on the first force detection information of the first arm by the robot control apparatus 30. The control based on the first force detection information refers to e.g. compliance control such as impedance control. Note that the first force detector 11 may be another sensor such as a torque sensor that detects a value indicating the magnitude of the force or moment acting on the first end effector E1 (or the flange for providing the first end effector E1 in the first manipulator M1).

The first force detector 11 is communicably connected to the robot control apparatus 30 by a cable. Wired communications via the cable are performed according to standards of e.g. Ethernet (registered trademark), USB, or the like. Note that the first force detector 11 and the robot control apparatus 30 may be adapted to be connected via wireless communications performed according to communication standards of Wi-Fi (registered trademark) or the like.

The second arm includes a second end effector E2, a second switch S2, a second manipulator M2, and a second force detector 12. Note that, in the embodiment, the case where the second arm includes the second end effector E2 is explained, however, the second arm and the second end effector E2 may be separately formed. In this case, the second arm includes the second manipulator M2 and the second force detector 12.

The second end effector E2 is an end effector having hook portions that can grasp an object in the example. Note that the second end effector E2 may be another end effector such as an end effector having an electrical screwdriver in place of the end effector having the hook portions. The second end effector E2 is a part corresponding to the hand tip of the second arm. The second end effector E2 is an example of the end effector.

The second end effector E2 is communicably connected to the robot control apparatus 30 by a cable. Thereby, the second end effector E2 performs actions according to control signals acquired from the robot control apparatus 30. Wired communications via the cable are performed according to standards of e.g. Ethernet (registered trademark), USB, or the like. Or, the second end effector E2 may be adapted to be connected to the robot control apparatus 30 via wireless communications performed according to communication standards of Wi-Fi (registered trademark) or the like.

The second switch S2 is a switch for switching a control mode when the robot control apparatus 30 controls the robot 20. The second switch S2 is provided in the second end effector E2 in the example. In the example, the second switch S2 is provided on a side surface of the second end effector E2 like the first switch S1. Note that the second switch S2 may be provided in another part of the second arm such as the second manipulator M2 or the robot control apparatus 30 instead. In this case, the robot 20 may have a configuration without the second end effector E2.

The second manipulator M2 has joint J11 to joint J17 as seven joints and a second imaging unit 22. Further, each of the joint J11 to joint J17 has an actuator (not shown). In other words, the second arm having the second manipulator M2 is a seven-axis vertical articulated arm. The second arm performs actions with the degree of freedom of seven axes by cooperative motion of the support, the second end effector E2, the second manipulator M2, and the respective actuators of the joint J11 to joint J17 as the seven joints of the second manipulator M2. Note that the second arm may be adapted to operate with the degree of freedom of eight or more axes.

As shown in FIG. 1, the joint J14 as the fourth joint from the support side of the seven joints of the second manipulator M2 is a joint corresponding to an elbow EL2 of the second arm. Further, the joint J17 as the seventh joint from the support side of the seven joints of the second manipulator M2 is an example of the most distal end joint of the joints of the arm. On the opposite end to the support of the ends of the joint J17, a flange for placement of the second end effector E2 is provided.

When the second arm operates with the degree of freedom of seven axes, the number of attitudes that can be taken is larger than that in the case where the second arm operates with the degree of freedom of six or less axes. Thereby, the second arm may smoothly move and easily avoid interferences with objects existing around the second arm, for example. Further, when the second arm operates with the degree of freedom of seven axes, control of the second arm is easier than that in the case where the arm operates with the degree of freedom of eight or more axes because the calculation amount is less.

The seven actuators (of the joints) of the second manipulator M2 are respectively communicably connected to the robot control apparatus 30 by cables. Thereby, the actuators operate the second manipulator M2 based on the control signals acquired from the robot control apparatus 30. Wired communications via the cables are performed according to standards of e.g. Ethernet (registered trademark), USB, or the like. Or, part or all of the seven actuators of the second manipulator M2 may be adapted to be connected to the robot control apparatus 30 via wireless communications performed according to communication standards of Wi-Fi (registered trademark) or the like.

The second imaging unit 22 is a camera including e.g. a CCD, a CMOS, or the like as an imaging device that converts collected lights into electrical signals. In the example, the second imaging unit 22 is provided in a part of the second manipulator M2. Accordingly, the second imaging unit 22 moves according to the movement of the second arm. Further, the range in which the second imaging unit 22 can capture images changes according to the movement of the second arm. The second imaging unit 22 may capture a still image of the range or a moving image of the range.

Further, the second imaging unit 22 is communicably connected to the robot control apparatus 30 by a cable. Wired communications via the cable are performed according to standards of e.g. Ethernet (registered trademark), USB, or the like. Note that the second imaging unit 22 may be adapted to be connected to the robot control apparatus 30 via wireless communications performed according to communication standards of Wi-Fi (registered trademark) or the like.

The second force detector 12 is provided between the second end effector E2 and the second manipulator M2. The second force detector 12 is e.g. a force sensor. The second force detector 12 detects a force and moment (torque) acting on the second end effector E2 (or the flange for providing the second end effector E2 in the second manipulator M2). The second force detector 12 outputs second force detection information containing a value indicating the magnitude of the detected force or moment as an output value to the robot control apparatus 30 via communications.

The second force detection information is used for control based on the second force detection information of the second arm by the robot control apparatus 30. The control based on the second force detection information refers to e.g. compliance control such as impedance control. Note that the second force detector 12 may be another sensor such as a torque sensor that detects a value indicating the magnitude of the force or moment acting on the second end effector E2 (or the flange for providing the second end effector E2 in the second manipulator M2).

The second force detector 12 is communicably connected to the robot control apparatus 30 by a cable. Wired communications via the cable are performed according to standards of e.g. Ethernet (registered trademark), USB, or the like. Note that the second force detector 12 and the robot control apparatus 30 may be adapted to be connected via wireless communications performed according to communication standards of Wi-Fi (registered trademark) or the like.

Further, the robot 20 includes a third imaging unit 23 and a fourth imaging unit 24.

The third imaging unit 23 is a camera including e.g. a CCD, a CMOS, or the like as an imaging device that converts collected lights into electrical signals. The third imaging unit 23 is provided in apart in which the unit can stereo-image the range that can be imaged by the fourth imaging unit 24 together with the fourth imaging unit 24. The third imaging unit 23 is communicably connected to the robot control apparatus 30 by a cable. Wired communications via the cable are performed according to standards of e.g. Ethernet (registered trademark), USB, or the like. Note that the third imaging unit 23 may be adapted to be connected to the robot control apparatus 30 via wireless communications performed according to communication standards of Wi-Fi (registered trademark) or the like.

The fourth imaging unit 24 is a camera including e.g. a CCD, a CMOS, or the like as an imaging device that converts collected lights into electrical signals. The fourth imaging unit 24 is provided in apart in which the unit can stereo-image the range that can be imaged by the third imaging unit 23 together with the third imaging unit 23. The fourth imaging unit 24 is communicably connected to the robot control apparatus 30 by a cable. Wired communications via the cable are performed according to standards of e.g. Ethernet (registered trademark), USB, or the like. Note that the fourth imaging unit 24 may be adapted to be connected to the robot control apparatus 30 via wireless communications performed according to communication standards of Wi-Fi (registered trademark) or the like.

The above described respective functional parts of the robot 20 acquire control signals from the robot control apparatus 30 built in the robot 20 in the example. Further, the respective functional parts perform operations based on the acquired control signals. Note that the robot 20 may be adapted to be controlled by the robot control apparatus 30 placed outside in place of the configuration containing the robot control apparatus 30. In this case, the robot 20 and the robot control apparatus 30 form the robot system. Or, the robot 20 may have a configuration without part or with none of the first imaging unit 21, the second imaging unit 22, the third imaging unit 23, and the fourth imaging unit 24.

The robot control apparatus 30 transmits the control signals to the robot 20 to operate the robot 20. Further, the user can teach (store) the actions of the robot 20 to the robot control apparatus 30 by direct teaching in the example. The actions of the robot 20 include one or both of the actions of the first arm and the actions of the second arm.

At direct teaching by the user, the robot control apparatus 30 changes the attitude of the first arm without changing the position or the attitude of the TCP of the first arm based on the magnitude of the moment applied about the rotation shaft of the joint J7 of the moment (torque) applied to the first end effector E1. Further, at direct teaching by the user, the robot control apparatus 30 changes the attitude of the second arm without changing the position or the attitude of the TCP of the second arm based on the magnitude of the moment applied about the rotation shaft of the joint J17 of the moment (torque) applied to the second end effector E2.

In the embodiment, processing by the robot control apparatus 30 based on the moment applied to the first end effector E1 at direct teaching will be explained in detail. As below, as an example, the case where the user stores the action of the first arm by direct teaching in the robot control apparatus 30 will be explained.

In this case, in the direct teaching, the user grasps and moves the first arm of the robot 20, and thereby, the action of the first arm is taught to the robot control apparatus 30. Further, in the direct teaching, in the action of the first arm desired to be taught to the robot control apparatus 30, information representing the positions of one or more via points (teaching points, points) via the TCP of the first arm, information representing the attitudes of the TCP desired to be realized by the first arm in the positions of the respective via points, and the attitudes desired to be realized by the first arm in the positions of the respective via points are taught to the robot control apparatus 30. In the example, the attitude of the first arm is indicated by the rotation angles of the actuators of the respective seven joints of the first manipulator M1.

Furthermore, in the teaching by the direct teaching, the first arm is controlled by the robot control apparatus 30 so that the attitude of the first arm may not change under its own weight by control based on the first force detection information acquired from the first force detector 11 (e.g. impedance control or the like).

Here, the summary of the processing by the robot control apparatus 30 according to the embodiment at direct teaching is explained. The robot control apparatus 30 may perform teaching by changing the attitude of the first arm based on the first force detection information containing the output value from the first force detector 11 with the first end effector E1 as the member provided on the tip of the joint J7 on the most distal end of the joints of the first arm set in desired position and attitude (in other words, with the position and the attitude of the TCP of the first arm set in desired position and attitude).

More specifically, the robot control apparatus 30 according to the embodiment changes the attitude of the first arm based on the moment applied to the first end effector E1 from the user with the TCP of the first arm set in desired position and attitude (in other words, with the position and the attitude of the TCP of the first arm fixed to desired position and attitude). In the example, the robot control apparatus 30 changes the angle of the above described elbow EL1 to change the attitude of the first arm with the position and the attitude of the TCP of the first arm fixed to desired position and attitude based on the moment. Thereby, the robot control apparatus 30 may teach a desired action by direct teaching. The angle of the elbow EL1 refers to the rotation angle of the actuator of the joint J4. Note that the robot control apparatus 30 may be adapted to change the angle of the other joint to change the attitude of the first arm with the position and the attitude of the TCP of the first arm fixed to desired position and attitude instead of changing the angle of the above described elbow EL1 to change the attitude of the first arm with the position and the attitude of the TCP of the first arm fixed in desired position and attitude.

Figure 3:
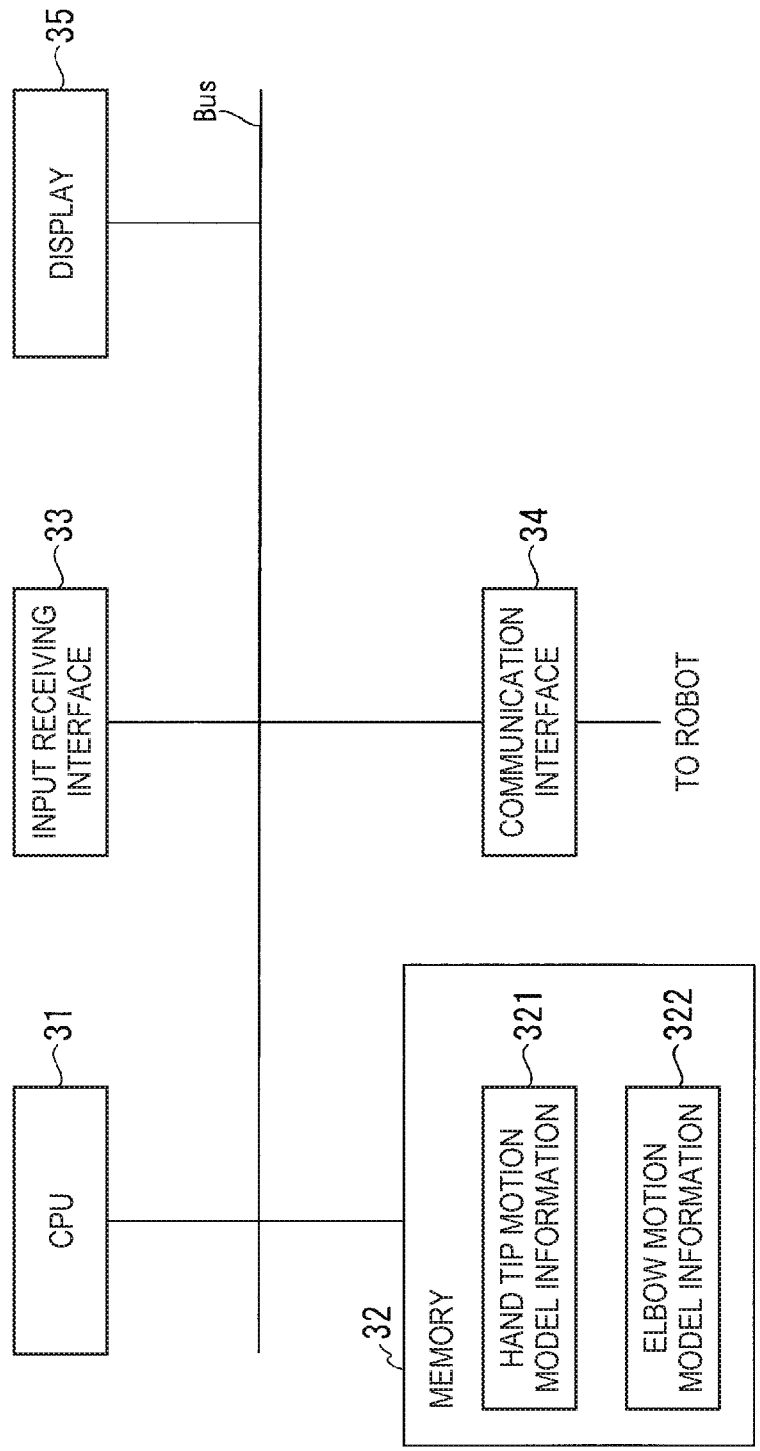
FIG. 3 shows an example of a hardware configuration of a robot control apparatus 30.

Next, a hardware configuration of the robot control apparatus 30 will be explained with reference to FIG. 3. FIG. 3 shows an example of the hardware configuration of the robot control apparatus 30. The robot control apparatus 30 includes e.g. a CPU (Central Processing Unit) 31, a memory 32, an input receiving interface 33, a communication interface 34, and a display 35. Further, the robot control apparatus 30 communicates with the robot 20 via the communication interface 34. These component elements are communicably connected to one another via a bus Bus.

The CPU 31 executes various programs stored in the memory 32.

The memory 32 includes e.g. an HDD (Hard Disk Drive), an SSD (Solid State Drive), an EEPROM (Electrically Erasable Programmable Read-Only Memory), a ROM (Read-Only Memory), a RAM (Random Access Memory), or the like. The memory 32 stores various information, images, programs to be processed by the robot control apparatus 30, hand tip motion model information 321 and elbow motion model information 322 shown in FIG. 3, etc. Note that the memory 32 may be an external memory device connected via a digital I/O port including USB or the like in place of the unit built in the robot control apparatus 30.

The hand tip motion model information 321 is information representing a mathematical model for calculation of first TCP position and attitude variations as variations in which the robot control apparatus 30 changes the position and the attitude of the TCP of the first arm based on the first force detection information acquired from the first force detector 11. The variation in which the robot control apparatus 30 changes the position of the TCP of the first arm is indicated by the variation from the present position of the TCP of the first arm to the changed position of the TCP of the first arm. Further, the variation in which the robot control apparatus 30 changes the attitude of the TCP of the first arm is indicated by Euler angles by which the respective three coordinate axes indicating the present attitude of the TCP of the first arm coincide with respective three coordinate axes indicating the changed attitude of the TCP of the first arm.

Further, the hand tip motion model information 321 is information representing a mathematical model for calculation of second TCP position and attitude variations as variations in which the robot control apparatus 30 changes the position and the attitude of the TCP of the second arm based on the second force detection information acquired from the second force detector 12. The variation in which the robot control apparatus 30 changes the position of the TCP of the second arm is indicated by the variation from the present position of the TCP of the second arm to the changed position of the TCP of the second arm. The variation in which the robot control apparatus 30 changes the attitude of the TCP of the second arm are indicated by Euler angles by which the respective three coordinate axes indicating the present attitude of the TCP of the second arm coincide with respective three coordinate axes indicating the changed attitude of the TCP of the second arm.

The elbow motion model information 322 is information representing a mathematical model for calculation of first elbow angle variations as variations in which the robot control apparatus 30 changes the angle of the elbow EL1 based on the first force detection information acquired from the first force detector 11. The variation in which the robot control apparatus 30 changes the angle of the elbow EL1 is indicated by the rotation angle from the present angle of the elbow EL1 to the changed angle of the elbow EL1.

Further, the elbow motion model information 322 is information representing a mathematical model for calculation of second elbow angle variations as variations in which the robot control apparatus 30 changes the angle of the elbow EL2 based on the second force detection information acquired from the second force detector 12. The variation in which the robot control apparatus 30 changes the angle of the elbow EL2 is indicated by the rotation angle from the present angle of the elbow EL2 to the changed angle of the elbow EL2.

Here, the hand tip motion model information 321 and the elbow motion model information 322 are explained. These mathematical models are mathematical models based on an equation of motion expressed by the following equation (1). Note that the detailed explanation of the equation of motion expressed by the equation (1) will be omitted because the equation is conventionally used in compliance control or the like.

$$M \frac{d^2 x(t)}{dt^2} + D \frac{dx(t)}{dt} + K x(t) = F(t) \quad (1)$$

M is an inertial mass matrix. D is a damper coefficient matrix. K is a spring multiplier matrix. The inertial mass matrix M, the damper coefficient matrix D, and the spring multiplier matrix K are predetermined. F(t) is a matrix having a force and moment applied to the first end effector E1 and the second end effector E2 at time t as elements. Further, in the hand tip motion model information 321, x(t) is a vector having variations of the position and the attitude of the TCP of the first arm due to application of the force and the moment contained in the matrix F(t) to the first end effector E1 or variations of the position and the attitude of the TCP of the second arm due to application of the force and the moment contained in the matrix F(t) to the second end effector E2 as elements. Furthermore, in the elbow motion model information 322, x(t) is a variable expressing the variation of the angle of the elbow EL1 due to application of the force and the moment contained in the matrix F(t) to the first end effector E1 or the variation of the angle of the elbow EL2 due to application of the force and the moment contained in the matrix F(t) to the second end effector E2.

For example, the robot control apparatus 30 substitutes the magnitudes of the force and the moment represented by the first force detection information (in other words, the force and the moment applied to the first end effector E1 from the user) in the matrix F(t) of the equation (1) and solves the equation (1), and thereby, calculates the vector x(t) having the variations of the position and the attitude of the TCP of the first arm due to application of the force and the moment contained in the matrix F(t) to the first end effector E1 as the above described first TCP position and attitude variations. Further, the robot control apparatus 30 substitutes the magnitudes of the force and the moment represented by the second force detection information (in other words, the force and the moment applied to the second end effector E2 from the user) in the matrix F(t) of the equation (1) and solves the equation (1), and thereby, may calculate the vector x(t) having the variations of the position and the attitude of the TCP of the second arm due to application of the force and the moment contained in the matrix F(t) to the second end effector E2 as the above described second TCP position and attitude variations.

For example, the robot control apparatus 30 substitutes the force and the moment represented by the first force detection information in the matrix F(t) of the equation (1) and solves the equation (1), and thereby, may calculate the variable x(t) expressing the variation of the angle of the elbow EL1 due to application of the force and the moment contained in the matrix F(t) to the first end effector E1 as the above described first elbow angle variation. Further, the robot control apparatus 30 substitutes the magnitudes of the force and the moment represented by the second force detection information (in other words, the force and the moment applied to the second end effector E2 from the user) in the matrix F(t) of the equation (1) and solves the equation (1), and thereby, may calculate the variable x(t) expressing the variation of the angle of the elbow EL2 due to application of the force and the moment contained in the matrix F(t) to the second end effector E2 as the above described second elbow angle variation.

The input receiving interface 33 is an input device such as e.g. a teaching pendant including a keyboard, a mouse, a touch pad, etc. Note that the input receiving interface 33 may be integrally formed with the display 35 as a touch panel.

The communication interface 34 includes e.g. a digital I/O port such as USB, an Ethernet (registered trademark) port, etc.

The display 35 is e.g. a liquid crystal display panel or an organic EL (ElectroLuminescence) display panel.

Figure 4:
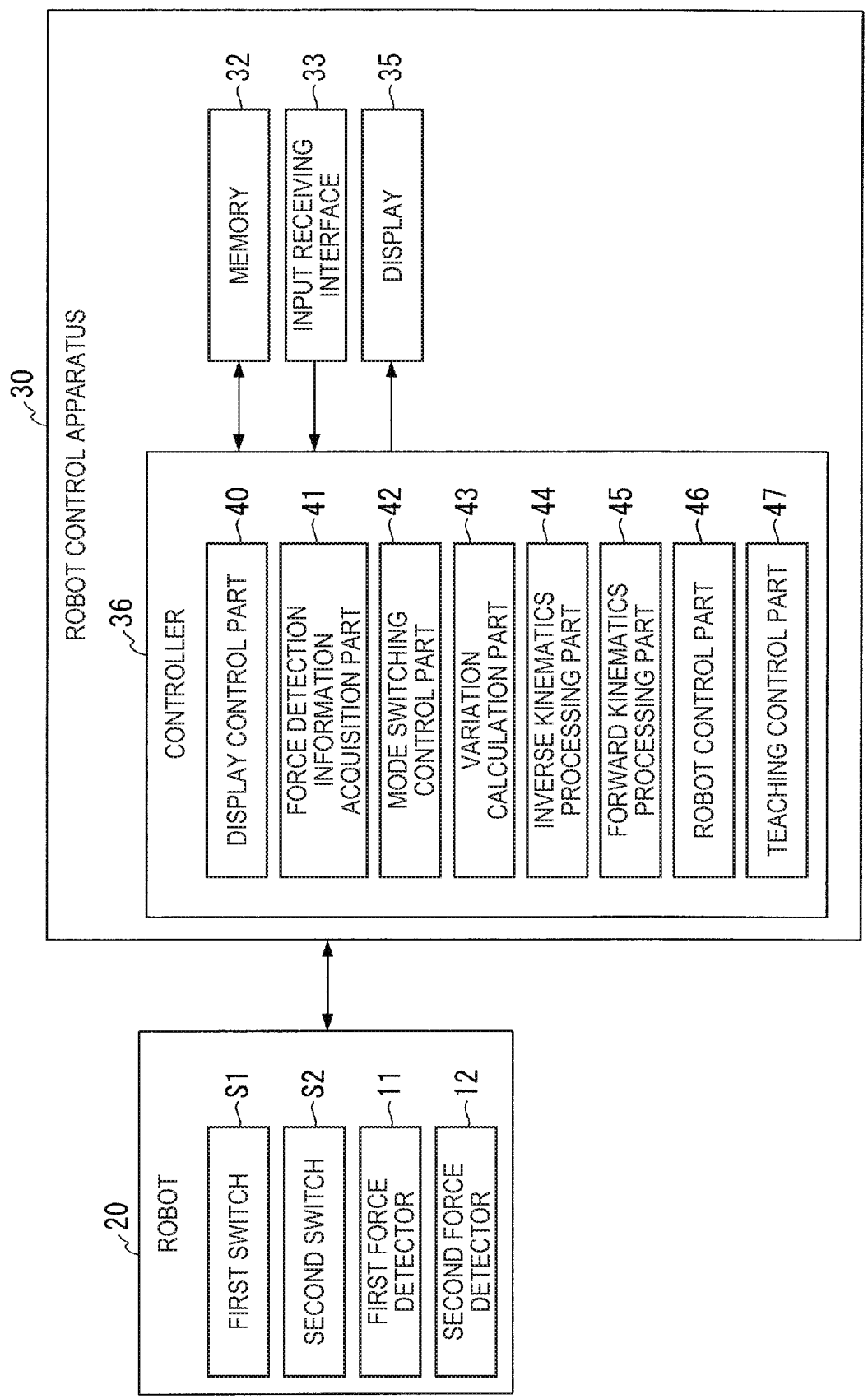
FIG. 4 shows an example of a functional configuration of the robot control apparatus 30.

Next, a functional configuration of the robot control apparatus 30 will be explained with reference to FIG. 4. FIG. 4 shows an example of the functional configuration of the robot control apparatus 30. The robot control apparatus 30 includes the memory 32, the input receiving interface 33, the display 35, and the controller 36.

The controller 36 controls the entire robot control apparatus 30. The controller 36 includes a display control part 40, a force detection information acquisition part 41, a mode switching control part 42, a variation calculation part 43, an inverse kinematics processing part 44, a forward kinematics processing part 45, a robot control part 46, and a teaching control part 47.

These functional parts of the controller 36 are realized by the CPU 31 executing various programs stored in the memory 32, for example. Note that part or all of the functional parts may be a hardware functional part such as an LSI (Large Scale Integration) or an ASIC (Application Specific Integrated Circuit).

The display control part 40 generates a teaching window that receives operations relating to teaching by direct teaching from the user. The display control part 40 allows the display 35 to display the generated teaching window.

The force detection information acquisition part 41 acquires the first force detection information from the first force detector 11. Further, the force detection information acquisition part 41 acquires the second force detection information from the second force detector 12.

When the first switch S1 is pressed down, the mode switching control part 42 sets (switches) the control mode of the controller 36 for the first arm (the control mode of the above described robot control apparatus 30) to a first mode. Further, when the pressing of the first switch S1 is released, the mode switching control part 42 sets (switches) the control mode of the controller 36 for the first arm to a second mode. When the second switch S2 is pressed down, the mode switching control part 42 sets (switches) the control mode of the controller 36 for the second arm (the control mode of the above described robot control apparatus 30) to the first mode. Further, when the pressing of the second switch S2 is released, the mode switching control part 42 sets (switches) the control mode of the controller 36 for the second arm to the second mode. Note that, instead, for example, when the first switch S1 or the second switch S2 is pressed down, the mode switching control part 42 may be adapted to set the control mode of the controller 36 for both the first arm and the second arm to the first mode, and, when the pressing of both the first switch S1 and the second switch S2 is released, set the control mode of the controller 36 for both the first arm and the second arm to the second mode.

When the control mode of the controller 36 is the first mode, the variation calculation part 43 reads the elbow motion model information 322 from the memory 32. Then, the variation calculation part 43 calculates the first elbow angle variation based on the first force detection information acquired from the force detection information acquisition part 41 and the read elbow motion model information 322. Further, the variation calculation part 43 calculates the second elbow angle variation based on the second force detection information acquired from the force detection information acquisition part 41 and the read elbow motion model information 322.

When the control mode of the controller 36 is the second mode, the variation calculation part 43 reads the hand tip motion model information 321 from the memory 32. Then, the inverse kinematics processing part 44 calculates the first TCP position and attitude variations based on the first force detection information acquired from the force detection information acquisition part 41 and the read hand tip motion model information 321. Further, the variation calculation part 43 calculates the second TCP position and attitude variations based on the second force detection information acquired from the force detection information acquisition part 41 and the read hand tip motion model information 321.

When the control mode of the controller 36 is the first mode, the inverse kinematics processing part 44 calculates, based on the first elbow angle variation calculated by the variation calculation part 43, the present position and attitude of the TCP of the first arm, and the inverse kinematics, the rotation angles of the actuators of the respective seven joints of the first manipulator M1 when the present angle of the elbow EL1 is changed by the first elbow angle variation without changing the position or the attitude. The rotation angles are rotation angles indicating the attitude of the first arm. Further, when the control mode of the controller 36 is the first mode, the inverse kinematics processing part 44 calculates, based on the second elbow angle variation calculated by the variation calculation part 43, the present position and attitude of the TCP of the second arm, and the inverse kinematics, the rotation angles of the actuators of the respective seven joints of the second manipulator M2 when the present angle of the elbow EL2 is changed by the second elbow angle variation without changing the position or the attitude. The rotation angles are rotation angles indicating the attitude of the second arm.

When the control mode of the controller 36 is the second mode, the inverse kinematics processing part 44 calculates, based on the first TCP position and attitude variations calculated by the variation calculation part 43, the present position and attitude of the TCP of the first arm, and the inverse kinematics, the rotation angles of the actuators of the respective seven joints of the first manipulator M1 when the position and the attitude are changed by the first TCP position and attitude variations. The rotation angles are rotation angles indicating the attitude of the first arm. Further, when the control mode of the controller 36 is the second mode, the inverse kinematics processing part 44 calculates, based on the second TCP position and attitude variations calculated by the variation calculation part 43, the present position and attitude of the TCP of the second arm, and the inverse kinematics, the rotation angles of the actuators of the respective seven joints of the second manipulator M2 when the position and the attitude are changed by the second TCP position and attitude variations. The rotation angles are rotation angles indicating the attitude of the second arm.

The forward kinematics processing part 45 calculates the present position and attitude of the TCP of the first arm based on the present rotation angles of the actuators of the respective seven joints of the first manipulator M1.

The forward kinematics processing part 45 determines whether or not changes of the position and the attitude of the TCP of the first arm by the robot control part 46 based on the first TCP position and attitude variations calculated by the inverse kinematics processing part 44 have been completed based on the present position and attitude of the TCP of the first arm and the forward kinematics. Further, the forward kinematics processing part 45 determines whether or not changes of the position and the attitude of the TCP of the second arm by the robot control part 46 based on the second TCP position and attitude variations calculated by the inverse kinematics processing part 44 have been completed based on the present position and attitude of the TCP of the second arm and the forward kinematics.

The forward kinematics processing part 45 determines whether or not changes of the attitude of the first arm by the robot control part 46 based on the first arm attitude variation calculated by the inverse kinematics processing part 44 have been completed based on the present attitude of the first arm. Further, the forward kinematics processing part 45 determines whether or not changes of the attitude of the second arm by the robot control part 46 based on the second arm attitude variations calculated by the inverse kinematics processing part 44 have been completed based on the present attitude of the second arm and the forward kinematics.

The robot control part 46 changes the attitude of the first arm based on the rotation angles indicating the attitude of the first arm calculated by the inverse kinematics processing part 44 as the rotation angles of the actuators of the respective seven joints of the first manipulator M1. Further, the robot control part 46 changes the attitude of the second arm based on the rotation angles indicating the attitude of the second arm calculated by the inverse kinematics processing part 44 as the rotation angles of the actuators of the respective seven joints of the second manipulator M2.

The teaching control part 47 stores e.g. the present position and attitude of the TCP of the first arm and the present attitude of the first arm in correspondence in the memory 32 based on the operation received from the user via the teaching window displayed on the display 35 by the display control part 40. Further, the teaching control part 47 stores e.g. the present position and attitude of the TCP of the second arm and the present attitude of the second arm in correspondence in the memory 32 based on the operation received from the user via the teaching window displayed on the display 35 by the display control part 40.

Figure 5:
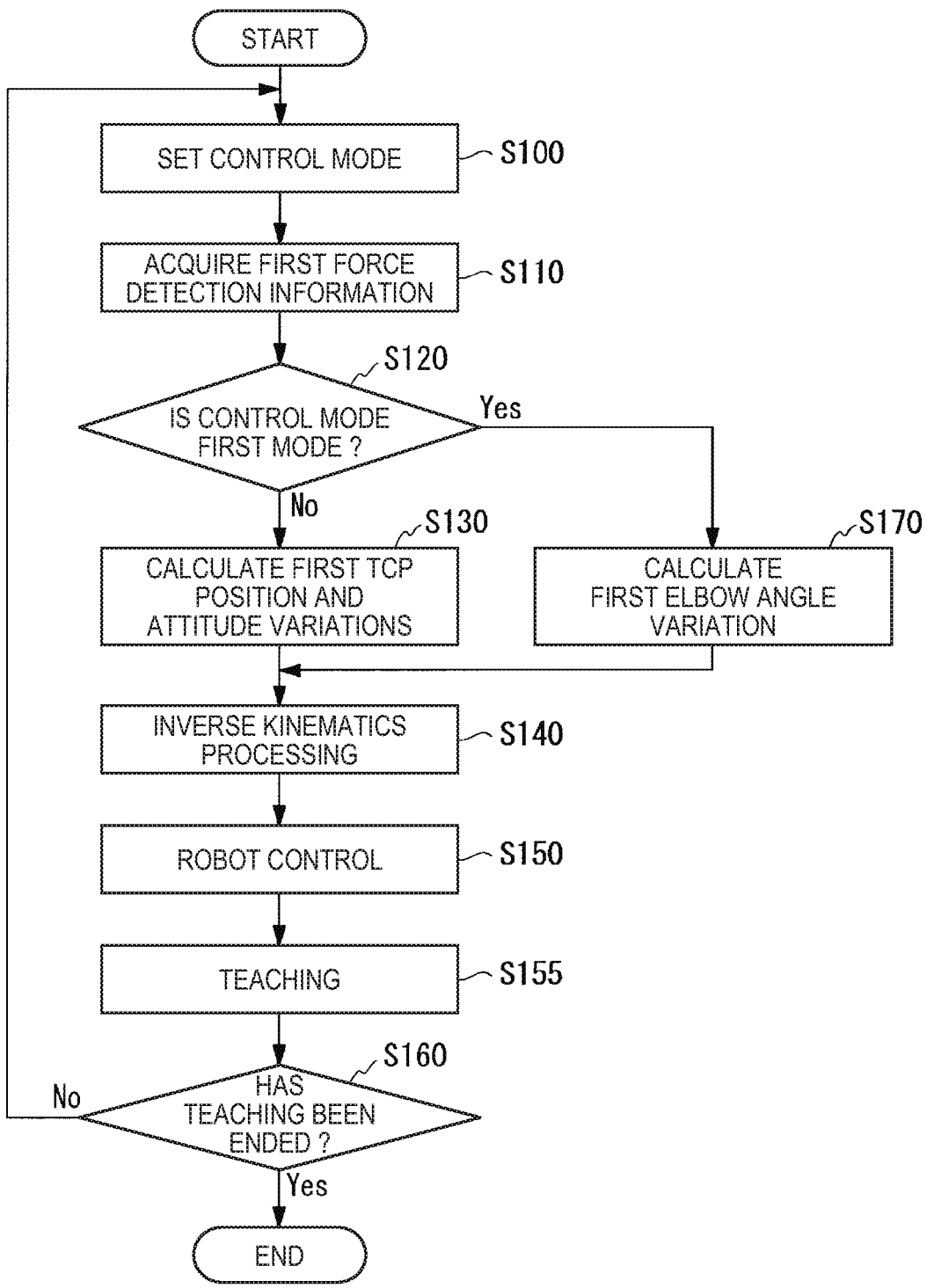
FIG. 5 is a flowchart showing an example of a flow of processing performed by a controller 36.

According to the above described configuration, when the user twists the first end effector E1 about the shaft of the joint J7 with the first switch S1 held down, the controller 36 changes the angle of the elbow EL1 without changing the position or the attitude of the TCP of the first arm from desired position and attitude (e.g. the present position and attitude of the TCP of the first arm). Further, when the user applies a force to the first end effector E1 or twists the first end effector E1 about the shaft of the joint J7 without pressing down the first switch S1, the controller 36 changes the position and the attitude of the TCP of the first arm. As below, referring to FIG. 5, the processing by the controller 36 will be explained. FIG. 5 is a flowchart showing an example of a flow of the processing performed by the controller 36.

The mode switching control part 42 sets the control mode of the controller 36 according to whether or not the first switch S1 has been pressed down (step S100). More specifically, the mode switching control part 42 determines whether or not the first switch S1 has been pressed down. Then, if determining that the first switch S1 has been pressed down, the mode switching control part 42 sets (switches) the control mode of the controller 36 to the first mode. On the other hand, if determining that the first switch S1 has not been pressed down, the mode switching control part 42 sets (switches) the control mode of the controller 36 to the second mode.

After the mode switching control part 42 sets the control mode of the controller 36 at step S100, the force detection information acquisition part 41 acquires the first force detection information from the first force detector 11 (step S110). Then, the variation calculation part 43 determines whether or not the control mode of the controller 36 set by the mode switching control part 42 at step S100 is the first mode (step S120).

If determining that the control mode of the controller 36 is not the first mode (step S120-No), the variation calculation part 43 reads the hand tip motion model information 321 from the memory 32, and calculates the first TCP position and attitude variations based on the read hand tip motion model information 321 and the first force detection information acquired by the force detection information acquisition part 41 at step S110 (step S130). On the other hand, if determining that the control mode of the controller 36 is the first mode (step S120—Yes), the variation calculation part 43 reads the elbow motion model information 322 from the memory 32, and calculates the first elbow angle variation based on the read elbow motion model information 322 and the first force detection information acquired by the force detection information acquisition part 41 at step S110 (step S170).

After the processing at step S130 or the processing at step S170, the inverse kinematics processing part 44 performs inverse kinematics processing (step S140). Here, the processing at step S140 is explained.

At step S140 after the first TCP position and attitude variations are calculated at step S130, the inverse kinematics processing part 44 allows the forward kinematics processing part 45 to calculate the present position and attitude of the TCP of the first arm (an example of desired position and attitude) based on the present rotation angles of the actuators of the respective seven joints of the first manipulator M1. Then, the inverse kinematics processing part 44 calculates the rotation angles indicating the attitude of the first arm when the position and the attitude of the TCP of the first arm are changed by the first TCP position and attitude variations as the rotation angles of the actuators of the respective seven joints of the first manipulator M1 based on the present position and attitude of the TCP of the first arm calculated by the forward kinematics processing part 45, the first TCP position and attitude variations calculated at step S130, and the inverse kinematics.

At step S140 after the first elbow angle variation is calculated at step S170, the inverse kinematics processing part 44 allows the forward kinematics processing part 45 to calculate the present position and attitude of the TCP of the first arm based on the present rotation angles of the actuators of the respective seven joints of the first manipulator M1. Then, the inverse kinematics processing part 44 calculates the rotation angles indicating the attitude of the first arm when the angle of the first elbow EL1 is changed by the first elbow angle variation as the rotation angles of the actuators of the respective seven joints of the first manipulator M1 without changing the position or the attitude of the TCP of the first arm from the present position and attitude as the desired position and attitude in the example based on the present position and attitude of the TCP of the first arm calculated by the forward kinematics processing part 45, the first elbow angle variation calculated at step S170, and the inverse kinematics.

After the processing at step S140, the robot control apparatus 30 equalizes the present rotation angles of the actuators of the respective seven joints of the first arm to the rotation angles of the seven actuators calculated at step S140, and thereby, changes the attitude of the first arm (step S150).

Here, the processing at step S150 is explained. At step S150 after the first TCP position and attitude variations are calculated at step S130, the robot control part 46 equalizes the present rotation angles of the actuators of the respective seven joints of the first arm to the rotation angles of the seven actuators calculated at step S140, and thereby, changes the attitude of the first arm and changes the position and the attitude of the TCP of the first arm. In other words, the robot control part 46 changes the position and the attitude of the TCP of the first arm based on the first force detection information acquired as a result by the user applying a force to the first end effector E1 or twisting the first end effector E1 about the shaft of the joint J7 (the first force detection information acquired at step S110). In this regard, the robot control part 46 continues to change the attitude of the first arm and the position and the attitude of the TCP of the first arm until the forward kinematics processing part 45 determines that the changes of the position and the attitude of the TCP of the first arm by the robot control part 46 based on the first TCP position and attitude variations calculated by the inverse kinematics processing part 44 have been completed based on the present position and attitude of the TCP of the first arm and the forward kinematics.

Further, at step S150 after the first elbow angle variation is calculated at step S170, the robot control part 46 equalizes the present rotation angles of the actuators of the respective seven joints of the first arm to the rotation angles of the seven actuators calculated at step S140, and thereby, changes the angle of the elbow EL1 without changing the position or the attitude of the TCP of the first arm from the present position and attitude and changes the attitude of the first arm. In other words, the robot control part 46 changes the attitude of the first arm without changing the position or the attitude of the TCP of the first arm from the present position and attitude based on the first force detection information acquired as a result by the user twisting the first end effector E1 about the shaft of the joint J7 (the first force detection information acquired at step S110). In this regard, the robot control part 46 continues to change the attitude of the first arm until the forward kinematics processing part 45 determines that the changes of the attitude of the first arm by the robot control part 46 based on the first elbow angle variation calculated by the inverse kinematics processing part 44 have been completed based on the present position and attitude of the TCP of the first arm, the present attitude of the first arm, and the forward kinematics.

Figure 6:
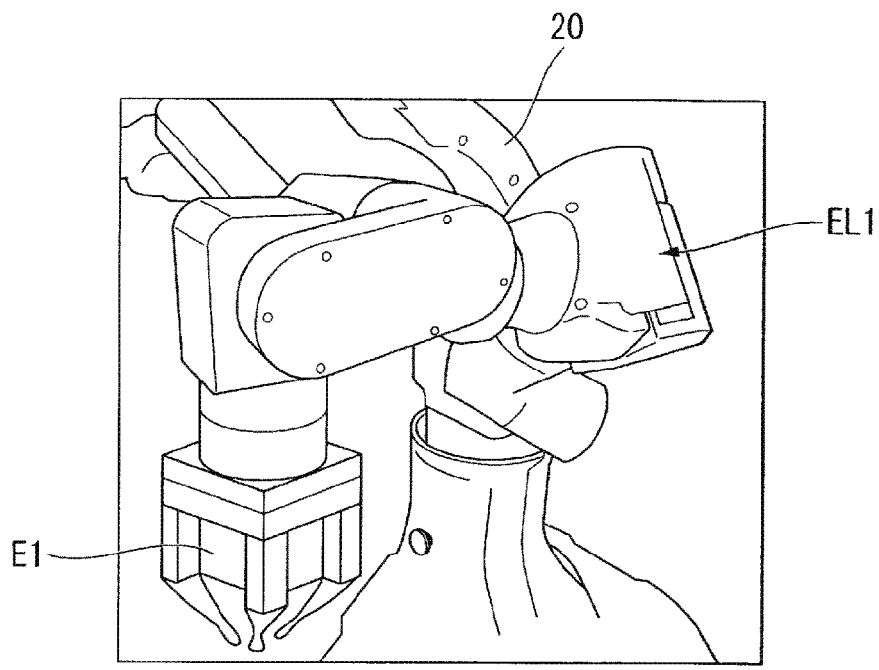
FIG. 6 shows an example of a state before an angle of an elbow EL1 is changed at step S150 after a first elbow angle variation is calculated at step S170.
Figure 7:
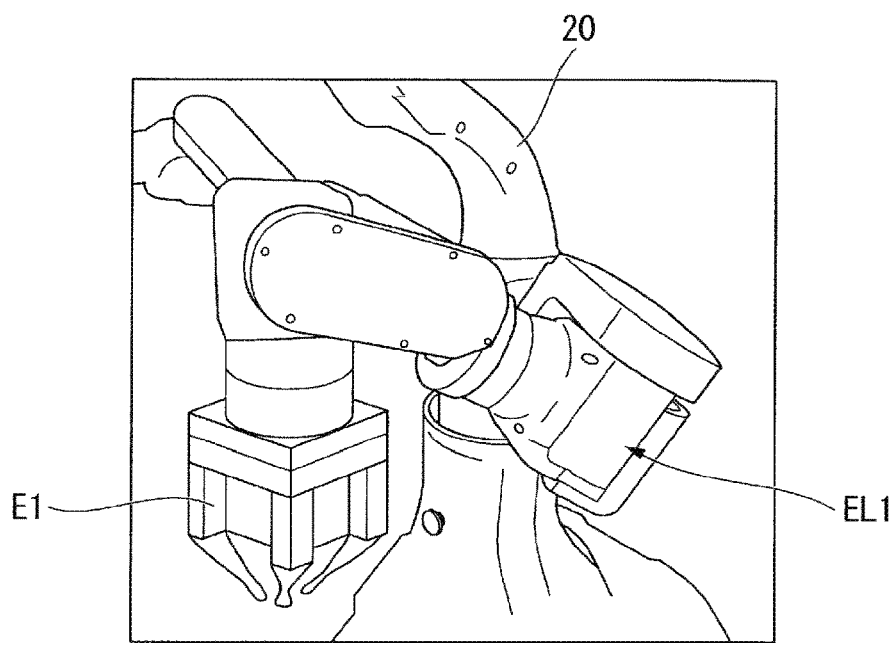
FIG. 7 shows an example of a state after a robot control part 46 changes the angle of the elbow EL1 without changing a position and an attitude of a TCP of a first arm from the state shown in FIG. 6.

FIG. 6 shows an example of a state before the angle of the elbow EL1 is changed at step S150 after the first elbow angle variation is calculated at step S170. FIG. 7 shows an example of a state after the robot control apparatus 46 changes the angle of the elbow EL1 without changing the position or the attitude of the TCP of the first arm from the state shown in FIG. 6.

In comparison between FIG. 6 and FIG. 7, it is known that the robot control part 46 changes the angle of the elbow EL1 without changing the position or the attitude of the first end effector E1, i.e., the position and the attitude of the TCP of the first arm from the present position and attitude. In this manner, by changing the angle of the elbow EL1 without changing the position or the attitude of the TCP of the first arm from the present position and attitude, the user may teach a desired action to the robot control apparatus 30 by direct teaching. For example, in the case where, when the position of the TCP of the first arm is equalized to a certain via point, the first arm interferes with another object unless the angle of the elbow EL1 of the first arm is changed, the user may change the angle of the elbow EL1 to an angle at which the first arm does not interfere with the other object without changing the position and the attitude of the TCP of the first arm from the present position and attitude by twisting the first end effector E1 about the shaft of the joint J7 with the first switch S1 held down.

After the processing at step S150, the teaching control part 47 allows the memory 32 to store the present position and attitude of the TCP of the first arm and the present attitude of the first arm in correspondence based on the operation received from the user via the teaching window displayed on the display 35 by the display control part 40 (step S155). Then, the teaching control part 47 determines whether or not the teaching by direct teaching has been ended (step S160). For example, the teaching control part 47 determines that the teaching by direct teaching has been ended when an operation for ending the teaching by direct teaching is received from the user via the teaching window displayed on the display 35 by the display control part 40.

If the teaching control part 47 determines that the teaching by direct teaching has not been ended (step S160-No), the mode switching control part 42 transitions to step S100 and sets the control mode of the controller 36 again. On the other hand, if the teaching control part 47 determines that the teaching by direct teaching has been ended (step S160— Yes), the controller 36 ends the processing.

Note that the robot control apparatus 30 described as above may have a configuration of changing the attitude of the first arm or the position and the attitude of the TCP of the first arm based on the output values (forces, moment (torque)) output from sensors and torque sensors that detect forces and moment applied to the respective part or all of the seven actuators of the first manipulator M1, a combination of force sensors and torque sensors, or the like in place of the configuration of changing the attitude of the first arm or the position and the attitude of the TCP of the first arm based on the first force detection information acquired from the first force detector 11 provided between the first end effector E1 and the first manipulator M1. In this case, the user applies forces and moment to the respective part or all of the seven actuators (i.e., seven joints) of the first manipulator M1, and thereby, may change the attitude of the first arm or the position and the attitude of the TCP of the first arm and perform direct teaching.

Modified Example 1 of Embodiment

As below, a modified example 1 of the embodiment of the invention will be explained with reference of the drawings. Note that the first arm will be explained as an example, however, the explanation in the modified example 1 of the embodiment can be applied to the second arm.

Figure 8:
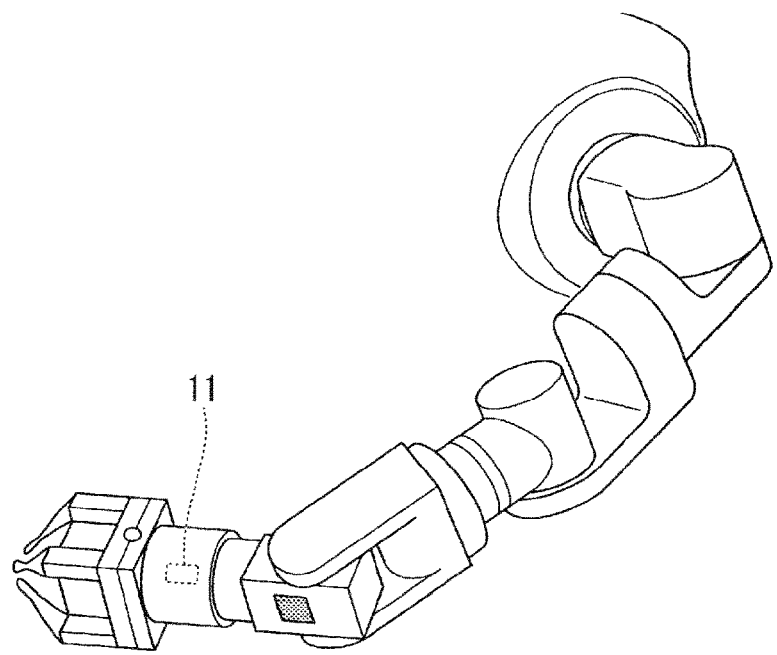
FIG. 8 shows an example of a first force detector 11 provided between the first end effector E1 and a first manipulator M1 of the robot 20.

In the above described embodiment, as shown in FIG. 8, the first force detector 11 is provided between the first end effector E1 and the first manipulator M1. FIG. 8 shows an example of the first force detector 11 provided between the first end effector E1 and the first manipulator M1 of the robot 20. In FIG. 8, the first force detector 11 is shown by a dotted rectangle for simplification of the drawing. In this case, the robot control apparatus 30 can change the attitude of the first arm by changing the angle of the elbow EL1 based on the moment applied to the first end effector E1. Thereby, it is unnecessary for the user to move from the position in which the user grasps the first end effector E1 at each time to change the angle of the elbow EL1. As a result, the robot control apparatus 30 may improve work efficiency of the user in direct teaching.

Figure 9:
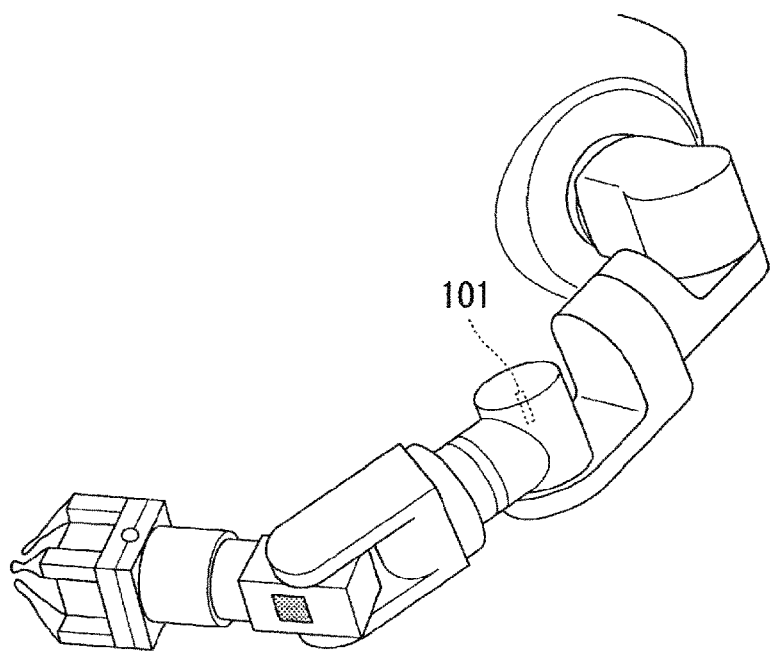
FIG. 9 shows an example of a force detector 101 provided in the elbow EL1.
Figure 10:
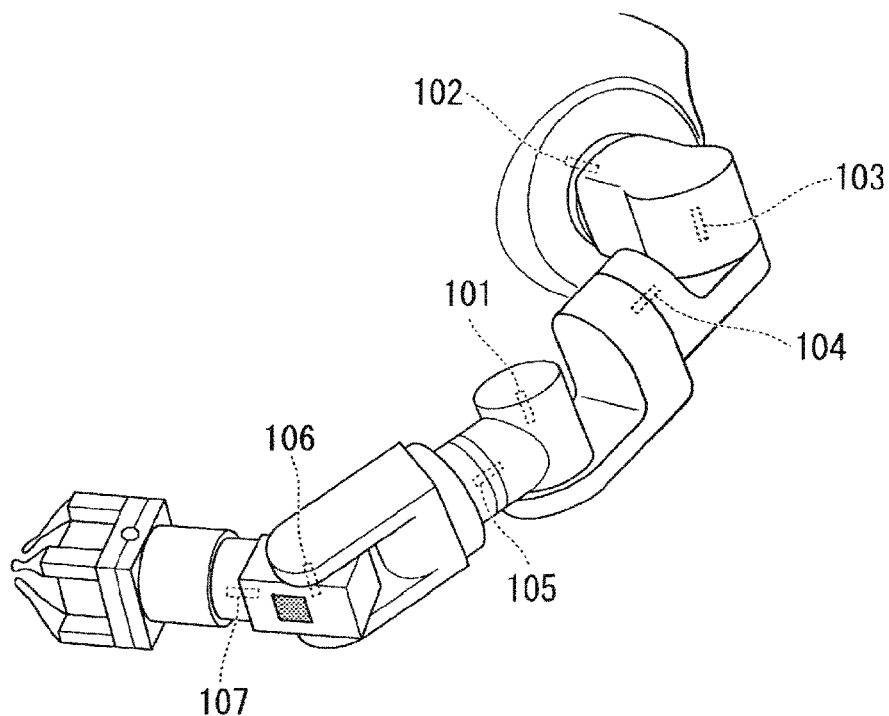
FIG. 10 illustrates force detectors respectively provided in seven joints of the first arm.

However, as shown in FIGS. 9 and 10, the robot 20 explained in the embodiment may include a force detector in another part different from the part between the first end effector E1 and the first manipulator M1. FIG. 9 shows an example of a force detection part 101 provided in the elbow EL1. In FIG. 9, the force detector 101 is shown by a dotted rectangle for simplification of the drawing.

The force detector 101 is a torque sensor in the example. The force detector 101 is provided in the elbow EL1. The force detector 101 detects moment (torque) applied to the actuator of the elbow EL1. The force detector 101 outputs force detection information containing a value indicating the magnitude of the detected moment as an output value to the robot control apparatus 30 via communications. The force detector 101 may be another sensor that detects a force or moment applied to the elbow EL1 such as a force sensor in place of the toque sensor.

When the first arm has the force detector 101 in the elbow EL1, the robot control apparatus 30 acquires the force detection information containing the value indicating the magnitude of the moment applied to the elbow EL1 from the force detector 101 as the output value. Then, the robot control apparatus 30 changes the attitude of the first arm by changing the angle of the elbow EL1 based on the acquired force detection information. In other words, to change the angle of the elbow EL1, the user applies a force to the elbow EL1 (presses the elbow, for example) in a direction in which the user desires to change the angle of the elbow EL1, and thereby, may generate moment for the actuator of the elbow EL1 to change the angle of the elbow EL1. As a result, the robot control apparatus 30 may suppress misoperation by the user of unintentionally changing the attitude of the first arm with the position of the TCP of the first arm fixed by the force or moment applied to the first end effector E1. Note that, in the example, the force detector 101 is provided in the elbow EL1, however, may be provided in another joint than the elbow EL1.

FIG. 10 illustrates force detectors respectively provided in the seven joints of the first arm. In FIG. 10, the first arm has the seven force detectors of the force detector 101 to force detector 107. Note that, in FIG. 10, the respective force detector 101 to force detector 107 are shown by dotted rectangles for simplification of the drawing.

The force detector 101 has been already explained in FIG. 9, and the explanation will be omitted. The respective force detector 102 to force detector 107 are torque sensor in the example.

The force detector 102 is provided in the joint J1 as the first joint from the support side of the seven joints of the first manipulator M1. The force detector 102 detects moment (torque) applied to the actuator of the joint J1. The force detector 102 outputs force detection information containing a value indicating the magnitude of the detected moment as an output value to the robot control apparatus 30 via communications.

The force detector 103 is provided in the joint J2 as the second joint from the support side of the seven joints of the first manipulator M1. The force detector 103 detects moment (torque) applied to the actuator of the joint J2. The force detector 103 outputs force detection information containing a value indicating the magnitude of the detected moment as an output value to the robot control apparatus 30 via communications.

The force detector 104 is provided in the joint J3 as the third joint from the support side of the seven joints of the first manipulator M1. The force detector 104 detects moment (torque) applied to the actuator of the joint J3. The force detector 104 outputs force detection information containing a value indicating the magnitude of the detected moment as an output value to the robot control apparatus 30 via communications.

The force detector 105 is provided in the joint J5 as the fifth joint from the support side of the seven joints of the first manipulator M1. The force detector 105 detects moment (torque) applied to the actuator of the joint J5. The force detector 105 outputs force detection information containing a value indicating the magnitude of the detected moment as an output value to the robot control apparatus 30 via communications.

The force detector 106 is provided in the joint J6 as the sixth joint from the support side of the seven joints of the first manipulator M1. The force detector 106 detects moment (torque) applied to the actuator of the joint J6. The force detector 106 outputs force detection information containing a value indicating the magnitude of the detected moment as an output value to the robot control apparatus 30 via communications.

The force detector 107 is provided in the joint J7 as the seventh joint from the support side of the seven joints of the first manipulator M1. The force detector 107 detects moment (torque) applied to the actuator of the joint J7. The force detector 107 outputs force detection information containing a value indicating the magnitude of the detected moment as an output value to the robot control apparatus 30 via communications.

Note that part or all of the force detector 101 to the force detector 107 may be other sensors that detect forces and moment applied to the elbow EL1 such as force sensors in place of the torque sensors.

As described above, when the first arm has the force detector 101 to the force detector 107, the robot control apparatus 30 acquires force detection information containing a value indicating the magnitude of the moment applied to the joint J1 from the force detector 102 as an output value. Further, the robot control apparatus 30 acquires force detection information containing a value indicating the magnitude of the moment applied to the joint J2 from the force detector 103 as an output value. Furthermore, the robot control apparatus 30 acquires force detection information containing a value indicating the magnitude of the moment applied to the joint J3 from the force detector 104 as an output value.

The robot control apparatus 30 acquires force detection information containing a value indicating the magnitude of the moment applied to the joint J4, i.e., the elbow EL1 from the force detector 101 as an output value. Further, the robot control apparatus 30 acquires force detection information containing a value indicating the magnitude of the moment applied to the joint J5 from the force detector 105 as an output value. Furthermore, the robot control apparatus 30 acquires force detection information containing a value indicating the magnitude of the moment applied to the joint J6 from the force detector 106 as an output value. The robot control apparatus 30 acquires force detection information containing a value indicating the magnitude of the moment applied to the joint J7 from the force detector 107 as an output value.

Then, the robot control apparatus 30 changes the angles of the respective joints of the first arm based on the force detection information respectively acquired from the force detector 101 to the force detector 107. More specifically, the robot control apparatus 30 changes the angle of the joint J1 based on the force detection information acquired from the force detector 102. Further, the robot control apparatus 30 changes the angle of the joint J2 based on the force detection information acquired from the force detector 103. Furthermore, the robot control apparatus 30 changes the angle of the joint J3 based on the force detection information acquired from the force detector 104.

The robot control apparatus 30 changes the angle of the joint J4 based on the force detection information acquired from the force detector 101. Further, the robot control apparatus 30 changes the angle of the joint J5 based on the force detection information acquired from the force detector 105. Furthermore, the robot control apparatus 30 changes the angle of the joint J6 based on the force detection information acquired from the force detector 106. The robot control apparatus 30 changes the angle of the joint J7 based on the force detection information acquired from the force detector 107.

In other words, the user applies a force to the joint at the angle that the user desires to change in the first arm (presses the joint, for example) in a direction in which the user desires to change the angle, and thereby, may generate moment for the actuator of the joint to change the angle of the joint. Thereby, the robot control apparatus 30 may easily change the angle of the joint desired by the user of the joints of the first arm, and may increase the degree of freedom of the attitude of the first arm that can be taught in direct teaching.

Note that the respective force detector 101 to force detector 107 may be sensors that detect magnitudes of pressure of parts pressed by the user. In this case, for example, part or all of the force detector 101 to the force detector 107 are provided on a surface of a part of a link connecting between the joints of the first arm (e.g. a link connecting the joint J4 and the joint J5) in place of the configuration where the force detector 101 to force detector 107 are provided in the respective joints of the first arm. The robot control apparatus 30 changes the angles of the joints associated with the sensors that detect the pressure according to the pressure applied to the surface by the user.

Figure 11:
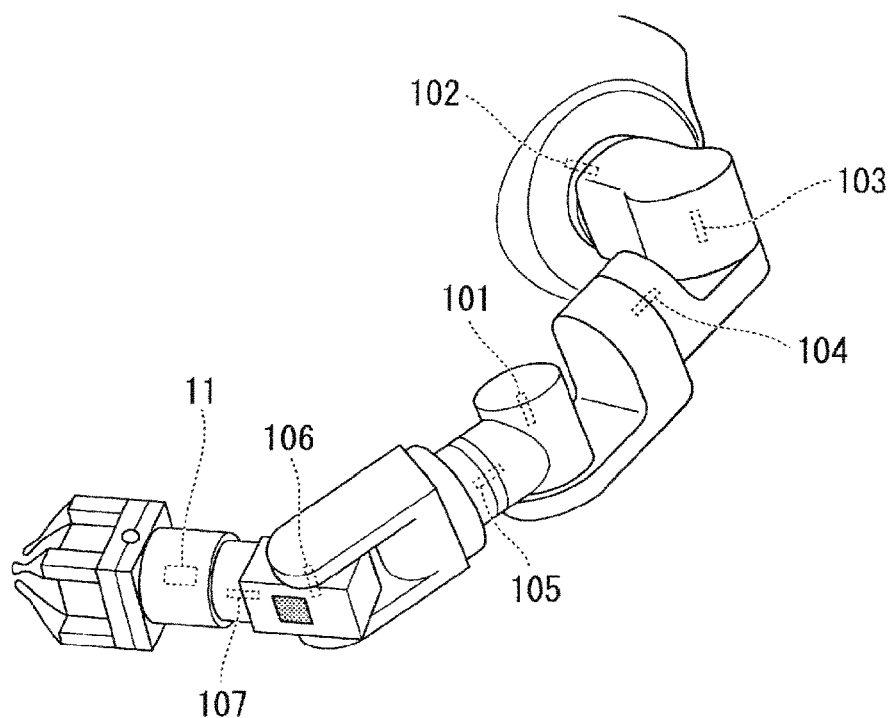
FIG. 11 shows an example of the first arm including the first force detector 11 between the first end effector E1 and the first manipulator M1 as shown in FIG. 8, and includes the respective force detectors 101 to 107 in the respective joints of the first arm as shown in FIG. 10.

Or, the robot 20 may include the first force detector 11 between the first end effector E1 and the first manipulator M1 as shown in FIG. 8 and include the respective force detector 101 to force detector 107 in the respective joints of the first arm as shown in FIG. 10. FIG. 11 shows an example of the first arm including the first force detector 11 between the first end effector E1 and the first manipulator M1 as shown in FIG. 8, and including the respective force detection parts 101 to 107 in the respective joints of the first arm as shown in FIG. 10.

In this case, the user may select changing of the attitude of the first arm by applying moment to the first end effector E1 or changing of the attitude of the first arm by applying a force to one of the joints of the first arm according to the work status in direct teaching. Thereby, the robot control apparatus 30 may improve the work efficiency of the user.

Modified Example 2 of Embodiment

As below, a modified example 2 of the embodiment of the invention will be explained with reference to the drawings. Note that the first arm will be explained as an example, however, the explanation in the modified example 2 of the embodiment can be applied to the second arm.

Figure 13:
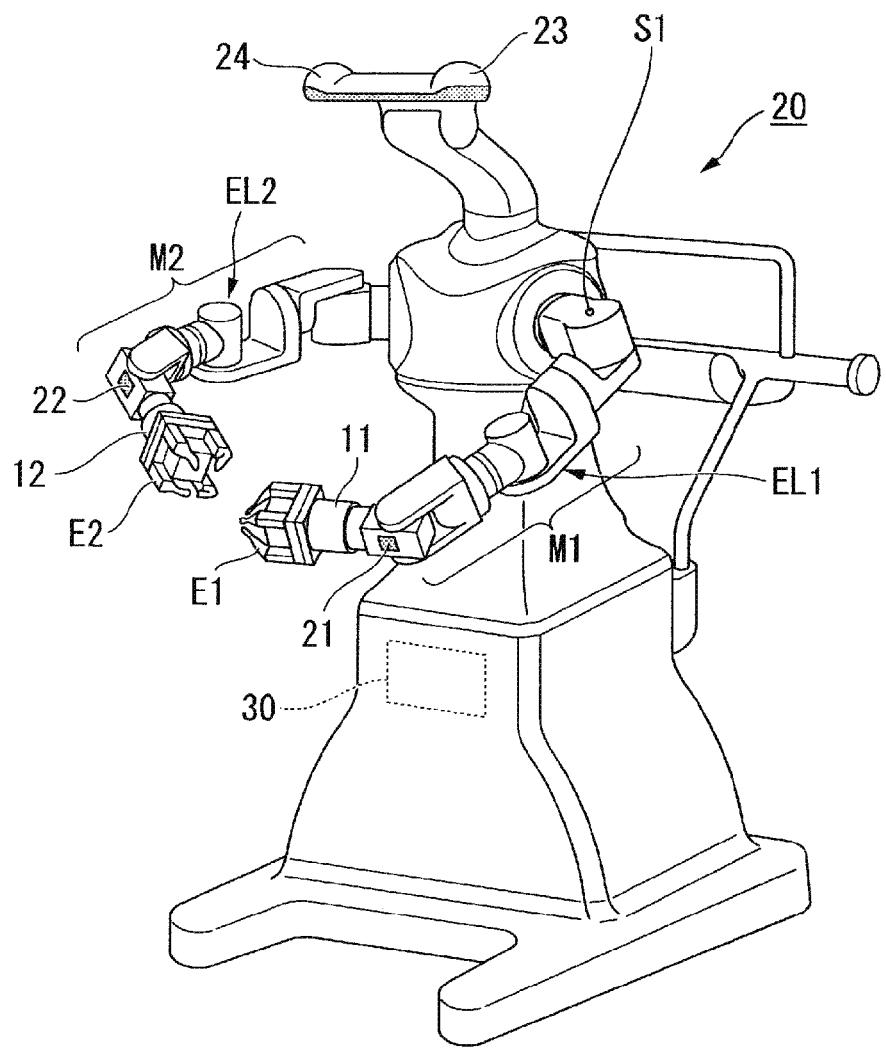
FIG. 13 shows an example of the robot 20 having the first switch S1 provided on a side surface of a joint J2.
Figure 14:
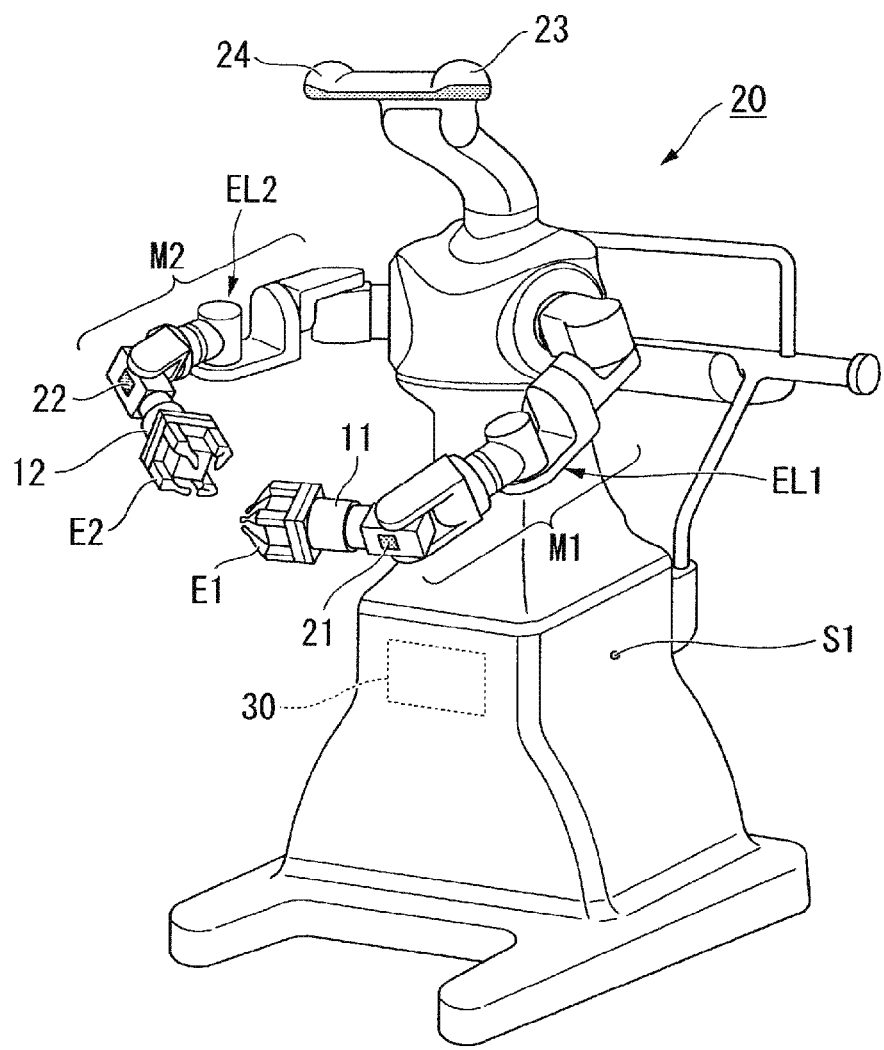
FIG. 14 shows an example of the robot 20 having the first switch S1 provided on a side surface of a support (main body).

In the above described embodiment, the first switch S1 is provided on the side surface of the first end effector E1. However, the robot 20 explained in the embodiment may have a configuration in which the first switch is provided in another position different from the side surface of the first end effector E1 as shown in FIGS. 12 to 14.

Figure 12:
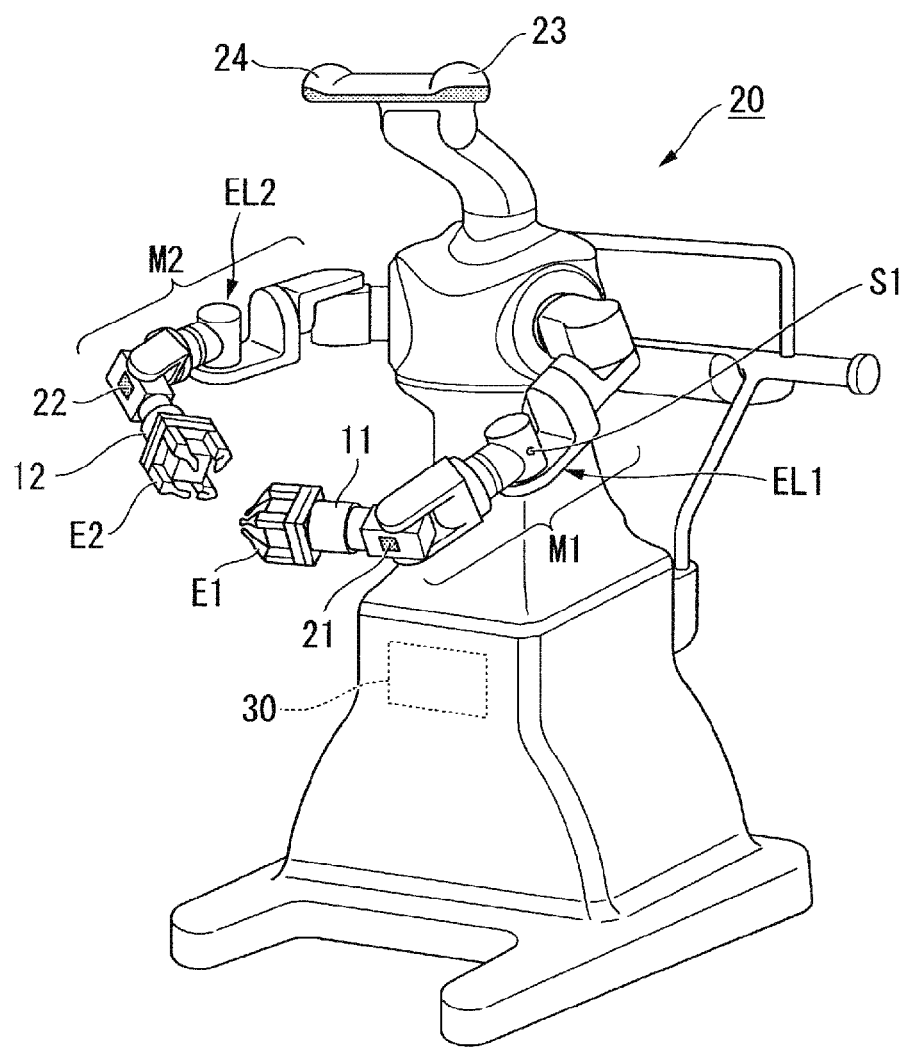
FIG. 12 shows an example of the robot 20 having the first switch S1 provided on a side surface of the elbow EL1.

FIG. 12 shows an example of the robot 20 having the first switch S1 provided on a side surface of the elbow EL1. The side surface of the elbow EL1 is e.g. a side surface on the circumference side with respect to the shaft about which the elbow EL1 rotates. Note that, in FIG. 12, the second switch S2 is not seen due to the attitude of the second arm. Further, FIG. 13 shows an example of the robot 20 having the first switch S1 provided on a side surface of the joint J2. The side surface of the joint J2 is e.g. a surface orthogonal to the shaft about which the joint J2 rotates on the link connecting the joint J1 and the joint J2. Note that, in FIG. 13, the second switch S2 is not seen due to the attitude of the second arm. Furthermore, FIG. 14 shows an example of the robot 20 having the first switch S1 provided on a side surface of the support (main body). The side surface of the support is e.g. a surface on the side on which the first arm is provided of the surfaces of the support. Note that, in FIG. 14, the second switch S2 is not seen because the switch is provided on the surface on which the second arm is provided.

As described above, the first switch S1 may be provided in another position than the side surface of the first end effector E1. Thereby, the user may provide the first switch S1 in a desired position of the robot 20. As a result, the robot control apparatus 30 may improve the work efficiency of direct teaching by the user.

Modified Example 3 of Embodiment

As below, a modified example 3 of the embodiment of the invention will be explained. The robot control apparatus 30 according to the above described embodiment may include a teaching apparatus (e.g. teaching pendant) that teaches actions of the robot 20 to the robot control apparatus 30. In this case, in the teaching apparatus, switches (including either or both buttons of hardware or buttons of software) for switching control modes of one or both of the first arm and the second arm to one of the first mode and the second mode in the robot control apparatus 30 may be provided. Thereby, for example, in the case where the user is closer to the teaching apparatus than the first switch S1, the user may switch the control mode of the first arm to one of the first mode and the second mode using the teaching apparatus without moving closer to the first switch S1. As a result, the robot control apparatus 30 may improve the work efficiency of direct teaching by the user.

As described above, the robot control apparatus 30 in the embodiment performs teaching by changing the attitude (indicated by the rotation angles of the respective actuators of the first manipulator M1 in the example) of the arm (the first arm in the example) based on the output value (the magnitude of the force and the moment contained in the first force detection information in the example) from the force detector (the first force detector 11 in the example) with the end effector (the first end effector E1 in the example) set in desired position and attitude. Thereby, the robot control apparatus 30 may teach a desired action by direct teaching.

Further, the robot control apparatus 30 changes the attitude of the arm by moving the elbow of the arm (the joint J4 in the example) based on the output value from the force detector. Thereby, the robot control apparatus 30 may teach a desired action with movement of the elbow of the arm by direct teaching.

Furthermore, the robot control apparatus 30 changes the attitude of the arm based on the torque generated by a twist on the end effector. Thereby, the robot control apparatus 30 may teach a desired action based on the torque generated by a twist on the end effector by direct teaching.

The robot control apparatus 30 detects torque based on the output value from the force detector. Thereby, the robot control apparatus 30 may teach a desired action based on the torque detected based on the output value from the force detector by direct teaching.

Further, the robot control apparatus 30 can switch, with the end effector set in desired position and attitude, between the first mode of changing the attitude of the arm based on the output value from the force detector and the second mode of changing the position and the attitude of the end effector based on the output value from the force detector. Thereby, the robot control apparatus 30 may teach a desired action by direct teaching by switching between the first mode and the second mode.

Furthermore, in the robot control apparatus 30, one or both of the robot 20 and the robot control apparatus 30 include the switch (the first switch S1 in the example) for switching between the first mode and the second mode. Thereby, the robot control apparatus 30 may teach a desired action by direct teaching by switching between the first mode and the second mode using the switch for switching between the first mode and the second mode.

The robot control apparatus 30 may perform teaching by changing the attitude of the arm based on the output value from the force detector with the end effector of the robot 20 that operates with the degree of freedom of seven axes set in desired position and attitude. Thereby, the robot control apparatus 30 may teach a desired action by direct teaching to the robot 20 that operates with the degree of freedom of seven axes.

As above, the embodiment of the invention is described in detail with reference to the drawings. The specific configurations are not limited to the embodiment and changes, replacements, deletions, etc. may be made without departing from the scope of the invention.

A program for realizing a function of an arbitrary configuration part in the above described apparatus (e.g. the robot control apparatus 30 of the robot 20) may be recorded in a computer-readable recording medium and the program may be read into a computer system and executed. Note that "computer system" here includes an OS (Operating System) and hardware such as a peripheral. Further, "computer-readable recording medium" refers to a portable medium such as a flexible disk, a magnetooptical disk, a ROM, a CD (Compact Disk)-ROM and a storage device such as a hard disk built in the computer system. Furthermore, "computer-readable recording medium" includes a medium that holds a program in a fixed period such as a volatile memory (RAM) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information including a network (communication network) such as the Internet and a communication line such as a phone line.

Further, the program may realize part of the above described function. Furthermore, the program may realize the above described function in combination with a program that has been already recorded in the computer system, the so-called differential file (differential program).

What is claimed is:

1. A control method for controlling a robot, the robot having an arm with a plurality of joints, the control method comprising:
    acquiring, by a controller, force detection information from a force detector;
    determining, by the controller, a control mode, the control mode being a first mode or a second mode;
    calculating, by the controller, an elbow angle variation based on the force detection information in the first mode, or a first TCP position and attitude variations based on the force detection information in the second mode;
    changing, by the controller, a position of the arm from a first position to a second position based on the force detection information and the elbow angle variation on the first mode, or the force detection information and the first TCP position and the attitude variations on the second mode, a TCP of the arm being set in a specific position in the first mode; and
    storing, by the controller, the second position, the attitude variations of the TCP of the second position, and an attitude of the arm of the second position in correspondence to memory.

* * * * *